Nov. 8, 1960 R. T. KELLEY 2,959,561
DISPERSING POLYMERS INTO CONVERGING STREAMS OF STEAM
Filed Sept. 19, 1956 2 Sheets-Sheet 1

FIG. I

ROLAND T. KELLEY INVENTOR

BY ATTORNEY

Nov. 8, 1960 R. T. KELLEY 2,959,561
DISPERSING POLYMERS INTO CONVERGING STREAMS OF STEAM
Filed Sept. 19, 1956 2 Sheets-Sheet 2

ROLAND T. KELLEY INVENTOR

BY [signature] ATTORNEY

United States Patent Office 2,959,561
Patented Nov. 8, 1960

2,959,561

DISPERSING POLYMERS INTO CONVERGING STREAMS OF STEAM

Roland Timothy Kelley, Baton Rouge, La., assignor to Esso Research and Engineering Company, a corporation of Delaware Filed Sept. 19, 1956, Ser. No. 611,812

12 Claims. (Cl. 260—29.6)

This invention relates to improved processes for the production of homopolymers or copolymers. More particularly, the present invention relates to improved methods of processing, for product recovery, rubbery polymerization products of isoolefins or mixtures of isoolefins with multiolefins and/or olefinic compounds containing at least one aromatic nucleus. The present invention also relates to improved processes of slurrying, in aqueous media, particles, of said polymerization products initially slurried or dissolved in non-aqueous diluents. This application is a continuation-in-part of U.S. patent application Serial Number 495,971, filed March 22, 1955 and abandoned August 28, 1957.

It is known that isoolefins such as isobutylene may be polymerized by Friedel-Crafts catalysts at temperatures below 0° C. to make polymers of relatively low, medium or high molecular weight. Both the low molecular weight (e.g. about 10,000 to 20,000 Staudinger) and the medium molecular weight (about 70,000 to 150,000 Staudinger) polymers have been made commercially and are currently available on the market. They are generally polymerized at temperatures of about 0° to about —55° F. in the presence of a hydrocarbon liquid, such as propane or hexane, etc., which is a solvent for the polymer as well as the monomer. The solution containing the polymer formed may be washed with water or aqueous caustic soda, etc. to inactivate and remove the catalyst, the solvent then being flashed off from the polymer without difficulty.

However, in the manufacture of very high molecular weight polyisoolefins such as polyisobutylene, e.g. having a Staudinger molecular weight above about 180,000, preferably between about 200,000 and 500,000, a different technique has been found advisable, namely polymerizing in about 1 to 10 volumes of a non-aqueous diluent such as an alkyl halide, particularly methyl chloride or other lower halo-alkane, and at a lower temperature, i.e. about —60° to about —350° F. preferably about —100° to —160° F., using a strong Friedel-Crafts catalyst such as aluminum chloride dissolved in an alkyl halide such as methyl chloride, preferably using high purity isobutylene, i.e. at least 98% and preferably at least 99% pure, and generally containing not more than 0.5% n-butenes.

Copolymers of isoolefins such as isobutylene, 2-methyl-1-butene, or 3-methyl-1-butene or the like with other olefinic compounds are likewise commercially produced in a non-aqueous diluent such as an alkyl halide having a boiling point below that of water. The polymerization is also performed at low temperatures, e.g. below about —60° F. and preferably below about —100° down to about —350° F. The polymer which is produced in a reaction zone is in the form of a slurry in the alkyl halide diluent. This slurry is then caused to flow into a zone where it is contacted with steam and water to remove volatile materials and to reslurry the polymer in aqueous suspension.

One of the major problems of handling such polymers, particularly if their Staudinger molecular weight is above about 10,000 or even more especially above about 100,000 for isoolefin-containing copolymers or above about 50,000 or especially between about 200,000 to 500,000 for polyisoolefins, is the agglomeration of the polymer particles into large lumps or masses that cannot be pumped through lines or otherwise conveniently processed. This effect becomes progressively worse with increasing polymer molecular weight. For high molecular weight polymers, the process is somewhat unreliable, causing excessive shut downs with consequent loss of production because of the necessity of opening and cleaning the plugged equipment.

It is, therefore, an object of the present invention to provide a process for preparing a satisfactory slurry of isoolefin copolymers or homopolymers such as polyisobutylene in an aqueous medium such as water.

It is another object of the invention to provide a process for recovering isoolefin copolymers or homopolymers such as polyisobutylene from the reaction mixture or reactor liquors in which it has been prepared.

It is a further object of the invention to provide means for slurrying in water the reactor effluent obtained by the Friedel-Crafts low temperature polymerization of isobutylene containing feeds in a low-freezing diluent which is either a polymer solvent or non-solvent.

It is a more specific embodiment of the invention to provide means for slurrying in water the reactor effluent obtained by aluminum chloride low temperature polymerization of isobutylene containing feeds in methyl chloride.

It is still a further object of the invention to prepare a water slurry of polyisobutylene, butyl rubber, or isobutylene-styrene copolymers from a slurry or solution of such polymers in non-aqueous diluents such as methyl chloride.

It is another object of this invention to prepare an aqueous slurry of copolymers of isoolefins such as isobutylene with multiolefins and/or olefinic compounds containing an aromatic nucleus from slurries or solutions of said copolymers in diluents comprising $C_1$ to $C_5$ alkyl halides, especially alkyl chlorides.

These and other objects of this invention will be apparent from the following description when read in connection with the accompanying drawings which represent one means of performing a typical process in accordance therewith and for accomplishing the objects of this invention and in which.

Figure 1:
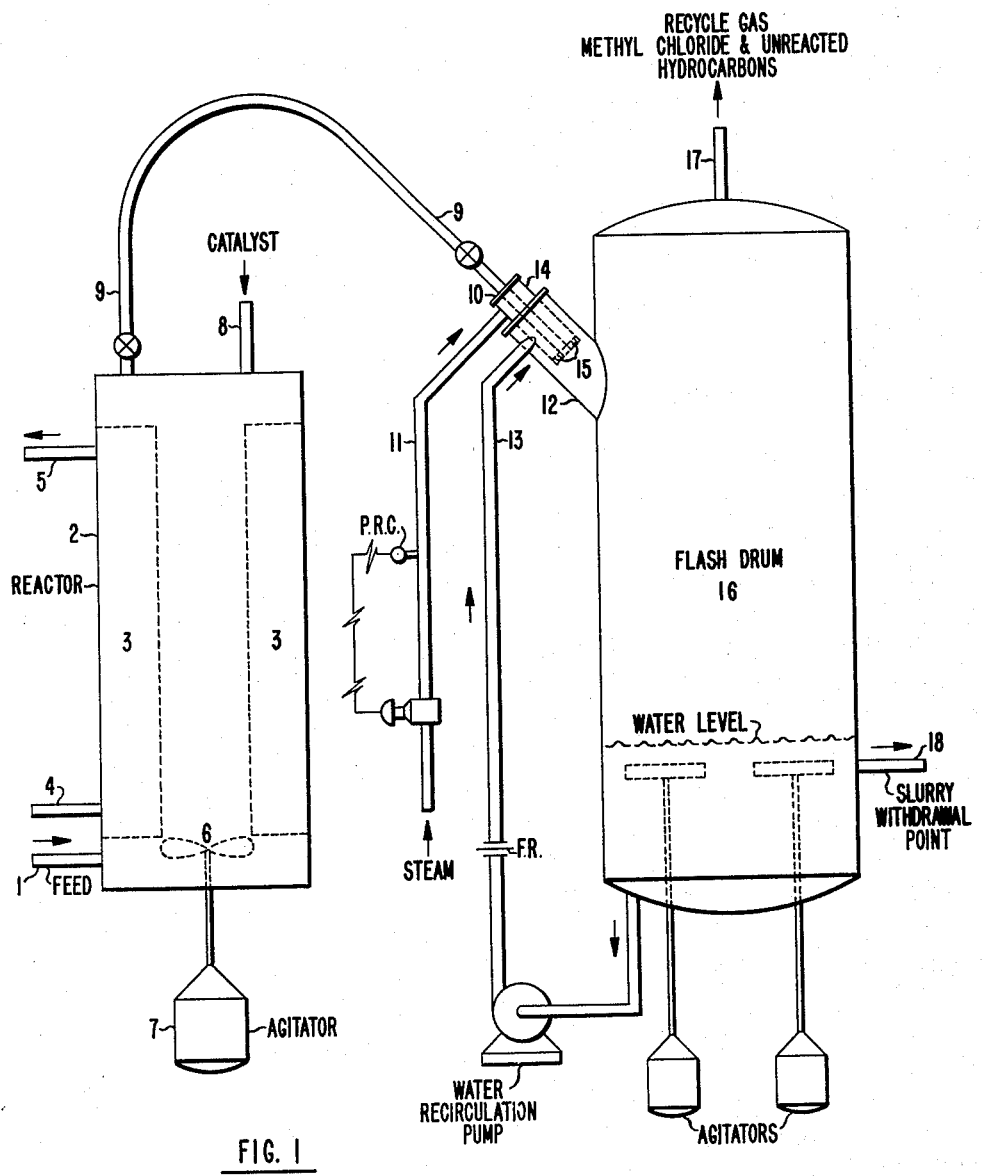
Figure 1 shows in a schematic manner an apparatus suitable for carrying out the present invention.
Figure 2:
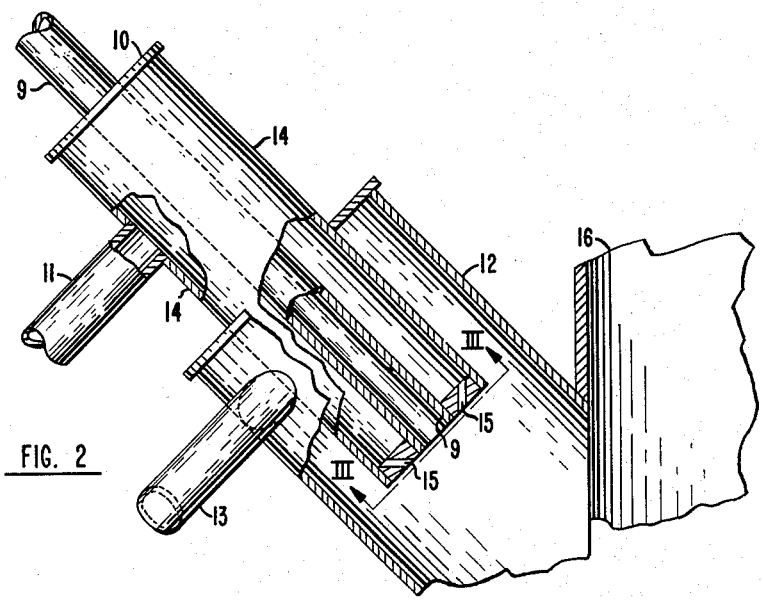
Figure 2 shows in cross-section a nozzle and attendant equipment found useful in accomplishing the present invention.

According to the present invention, a flowing solution or slurry in a non-aqueous diluent of an isoolefin-containing homopolymer or copolymer is contacted with a plurality of streams of steam converging in the direction of flow of polymer suspension, then contacted with water, and passed in unrestricted flow into a zone containing hot water preheated to a temperature sufficient to volatilize the non-aqueous diluent.

In a preferred embodiment of the invention, polyisobutylene, butyl rubber, chlorinated butyl rubber, isobutylene-styrene copolymers and the like, during polymerization, or later, are slurried or dissolved in an alkane halide diluent which is a polymer non-solvent but an aluminum halide catalyst solvent. This slurry is caused to move as a downwardly flowing stream and contacted with steam converging in the downward direction of flow of polymer suspension, the steam being injected at a sufficient velocity that the polymer particles are dispersed. The dispersed particles formed are then contacted with downwardly swirling water whereby a dispersion of polymer particles in water is obtained and the resulting dispersion finally passed downwardly in unrestricted flow into a zone containing warm water.

Butyl rubber, may, as hereinbefore mentioned, be processed according to the improved method of the present invention. Butyl rubber comprises a copolymer of a $C_4$ to $C_8$, preferably a $C_4$ to $C_6$ isoolefin such as isobutylene, with a $C_4$ to $C_{14}$ multiolefin, preferably a $C_4$ to $C_6$ conjugated diolefin, prepared at low temperatures by Friedel-Crafts catalysis. The most advantageous multiolefins are isoprene, butadiene, dimethallyl, myrcene, allo-ocymene, cyclopentadiene, cyclohexadienes and the like; isoprene being preferred. Conventional methods of preparing butyl rubber polymers are described in U.S. Patent 2,356,128.

In preparing butyl rubber, the monomers are mixed in a preferred ratio of about 70 to 99.5, or even more especially about 85 to 99.5 parts by weight of the isoolefin, to about 0.5 to 30, preferably 0.5 to 15 parts by weight of the multiolefin. The mixture of monomers is diluted with about 1 to 10, preferably 2 to 5, volumes of a lower alkane halide such as methyl chloride, and cooled to a temperature between about 0° to −350° F., advantageously about −40° to −250° F., preferably about −100° to −170° F. The cold mixture is then polymerized by the addition thereto of about 0.1 to 2.0%, preferably 0.2 to 1.0% by weight based on monomers, of a Friedel-Crafts catalyst, preferably an aluminum halide such as aluminum chloride dissolved in an alkyl halide such as methyl chloride. Powerful and efficient stirring and agitation is desirable to disperse the catalyst into the cold olefinic material.

The polymerization proceeds rapidly to yield the desired polymer which precipitates out from the solution in the form of a flocculent white solid having many of the physical characteristics of raw gum rubber. The cold methyl chloride-butyl rubber slurry is then contacted with steam and hot water (which may contain caustic soda or an alcohol, aldehyde or organic acid to inactivate the catalyst) and/or zinc stearate or other anti-tack agent in accordance with the invention. The steam and hot water also serve the purpose of flashing off the catalyst solvent, unpolymerized olefins, etc., leaving the non-volatile butyl rubbery polymer in the water as a slurry. The resulting butyl rubber copolymer, as recovered, generally has a relatively low unsaturation as indicated by an iodine number (Wijs) of about 0.5 to 50, preferably 1 to 20. The butyl rubbery copolymer also generally has a Staudinger molecular weight of at least 5,000, preferably at least 20,000 up to about 100,000 or 150,000; an especially desirable range of molecular weight being between about 25,000 and 80,000.

Another type of polymer suitable for the purposes of the present invention is a modified butyl-derived copolymer which is vulcanizable with basic metal compounds and covulcanizable with more highly unsaturated rubbers. This rubber is made by chlorinating butyl rubber in a manner which does not degrade the molecular weight thereof, but sufficiently to produce a rubber which when vulcanized retains its tensile strength upon heat aging. More particularly, rubbery materials of the type of butyl rubber are chlorinated so as to contain about at least 0.5 wt. percent (preferably at least about 1.0 wt. percent) combined chlorine but not more than about "X" wt. percent combined chlorine wherein:

$$X = \frac{35.46L}{(100-L)M_1 + L(M_2 + 35.46)} \times 100$$

and:

L = mole percent of the multiolefin in the polymer.
$M_1$ = molecular weight of the isoolefin.
$M_2$ = molecular weight of the multiolefin.
35.46 = atomic weight of chlorine.

Restated, there is at least about 0.5 weight percent of combined chlorine in the polymer but not more than about one atom of chlorine combined in the polymer per molecule of multiolefin present therein; i.e. not more than about one atom of combined chlorine per double bond in the polymer.

Suitable chlorinating agents which may be employed are gaseous chlorine, alkali metal hypochlorites (preferably sodium hypochlorite), alkyl hypochlorites (preferably $C_4$–$C_{10}$ tertiary alkyl hypochlorites), sulfur chlorides (particularly oxygenated sulfur chlorides), pyridinium chloride perchloride, N-chlorosuccinimide, alpha-chloroacetoacetanilide, tri-chlorophenyl chloride, N-chloroacetamide, beta-chloro-methyl phthalimide, and other common chlorinating agents. The preferred chlorinating agents are gaseous chlorine and sulfuryl chloride.

The chlorination is conducted at temperatures above about 32° F. up to about 212° F., advantageously at about 35° F. to 150° F., preferably at about 50° to 120° F. (room temperature being satisfactory), depending upon the particular chlorinating agent, for about one minute to several hours. An advantageous pressure range is from about 0.5 to 400 p.s.i.a.; atmospheric being satisfactory. The chlorination conditions are regulated to chlorinate the rubbery copolymer to the extent above mentioned. For example, if the butyl rubber is GR-I-18 rubber, i.e. having a Mooney viscosity at 212° F. for 8 minutes of about 70 to 80 and a mole percent unsaturation of about 1.5 to 2.0, it is preferably chlorinated to contain about 0.5 to 2.5%, preferably about 0.8 to 1.8% combined chlorine.

The chlorination may be accomplished in various ways. One process comprises preparing a solution of the copolymer as above, in a suitable inert liquid organic solvent such as a $C_3$ to $C_8$ or preferably a $C_5$ to $C_7$ inert hydrocarbon or halogenated derivatives of saturated hydrocarbons, examples of which are hexane, heptane, pentane, branched chain paraffins, naphtha, kerosene, straight run mineral spirits, cyclohexane, cyclopentane, alkyl substituted cycloparaffins, benzene, toluene, chlorobenzene, chloroform, trichloroethane, carbontetrachloride, carbon disulfide, mixtures thereof, etc., and adding thereto gaseous chlorine or other chlorinating agent, which may optionally be in solution, such as dissolved in an inert hydrocarbon, an alkyl chloride, carbontetrachloride, carbon disulfide, etc.

The concentration of the butyl rubber in the solvent will depend upon the type of reactor, molecular weight of the butyl rubber, etc. In general, the concentration of a butyl rubber having a viscosity average molecular weight of about 200,000 to about 400,000, if the solvent is a substantially inert hydrocarbon, will be between 1 and 30% by weight, preferably about 5 to 20%. If chlorine gas is employed to chlorinate such a rubbery solution, it may also be diluted with up to about 5 times its volume, preferably about 0.1 to 2.0 times its volume of an inert gas such as nitrogen, methane, ethane, carbon dioxide, etc.

The resulting chlorinated butyl rubber polymer may be recovered in accordance with the invention by injection into a zone containing steam and hot water whereby to flash off the hydrocarbon solvent and form an aqueous slurry of the chlorinated butyl rubber. The chlorinated butyl rubber may then be separated from this slurry by filtration, dried and recovered as a "crumb" or as a dense sheet or slab by conventional milling and/or extruding procedures. Other butyl-derived rubbery polymers, suitably processed in accordance with the present invention, include nitroso-modified butyl rubbery polymers which are essentially the reaction product of butyl rubber with aromatic nitroso compounds containing at least one nitroso group and about 0 to 5 other functional groups; (e.g. p-nitroso phenol, m-nitrosobenzaldehyde, N-nitroso p-nitroso anilines, etc.). The polymers may contain polymerized therein, not only an isoolefin and a multiolefin, but also about 1 to 30%, preferably about 5 to 20% of such olefinic compounds as styrene, alpha methyl styrene, p-methyl styrene, indene, dihydronaphthalene, p-chlorostyrene, dichlorostyrene, mixtures thereof, etc.

Another rubbery polymer which may be processed in accordance with the invention, as beforementioned, is high molecular weight polyisobutylene, having a Staudinger molecular weight above about 100,000, and preferably between about 200,000 and 500,000. High molecular weight polyisobutylene is advantageously made by polymerizing isobutylene in 1 to 20, preferably 2 to 8 volumes of methyl chloride at temperatures between about —80° to —200° F. using an aluminum chloride catalyst dissolved in methyl chloride as hereinbefore mentioned. The isobutylene used is preferably of at least 99% purity. Polymerization may be conveniently carried out in a commercial plant normally intended for making butyl rubber as outlined above.

Another type of polymer which is advantageously processed in accordance with the present invention is the copolymerization product of a $C_4$ to $C_8$, preferably a $C_4$ to $C_6$ isoolefin with a monoolefinic compound containing an aromatic nucleus such as styrene, alphamethyl styrene, p-methyl styrene, indene, dihydronaphthalene, p-chlorostyrene, dichlorostyrene, mixtures thereof, etc. The polymer may be produced by reacting about 5–95%, advantageously about 20 to 80%, preferably about 30 to 70%, and even more especially 45 to 60% of the isoolefin with about 5 to 95%, advantageously about 20 to 80%, preferably about 30 to 70%, and even more especially 40 to 55% of the monoolefinic aromatic compound. The product is advantageously formed by Friedel-Crafts polymerization of the above monomers at temperatures below about —40° F. and preferably between about —100° and —350° F. in the presence of an alkyl halide diluent such as methyl chloride. If the reacting monomers have a ratio in parts by weight of between about 5 to 40 parts of the monoolefinic aromatic compound to about 60 to 95 parts of the isoolefin, the resulting reaction mixture is in the form of a slurry, whereas if there is a ratio of about 50 to 95 parts of the monoolefinic aromatic compound to about 5 to 50 parts of the isoolefin, the resulting reaction mixture is in the form of a solution. Copolymers falling between these two classes of copolymers are generally partially in solution and partially in the form of a slurry. The improved process of recovering polymers is applicable to all of these types of copolymers hereinbefore mentioned. The resulting products have Staudinger molecular weights between about 10,000 and 500,000, preferably between about 10,000 and 100,000; the intrinsic viscosity of the polymers being between about 0.5 and 3.0. Further details for the production of such polymers are described in U.S. Patents 2,274,749; U.S. 2,519,092; U.S. 2,609,359; and U.S. 2,643,993.

The advantages of the present invention will be better understood from the following detailed description read in conjunction with the accompanying drawings:

Referring now to the drawings, a blend of 12–20 wt. percent (e.g. 16 wt. percent) of isobutylene in methyl chloride was fed by line 1 to reaction zone 2. The reaction zone was well agitated and cooled by boiling ethylene. The reaction zone consisted of a reactor vessel provided with tubes 3 around which cold boiling ethylene was circulated by lines 4 and 5. Circulation of reactants through the tubes was maintained by stirrer 6 operated by motor 7. The polymerization in reaction zone 2 was controlled at a desired conversion level of 80–90% (e.g. 85%) by the addition of aluminum chloride dissolved in methyl chloride through line 8. In one run, a small amount (i.e. 0.02 wt. percent based on polymer) of diisobutylene was added with the feed through line 1 to control the molecular weight.

Figure 3:
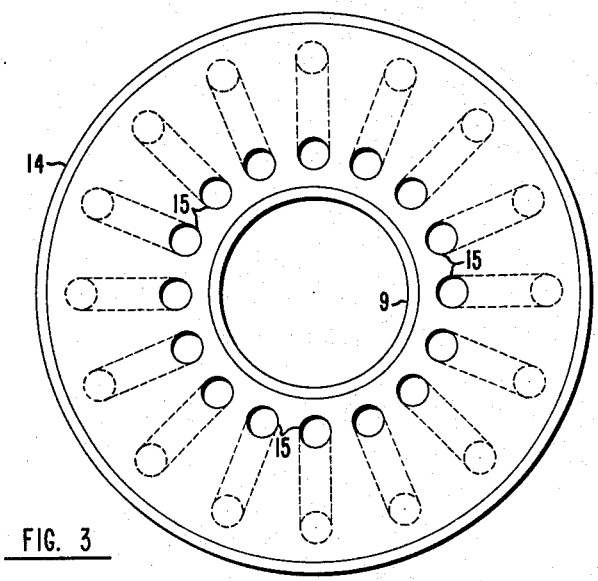
Figure 3 is a cross-section taken along the lines III—III of Figure 2.

The cold reaction mixture containing the polymer formed, suspended in methyl chloride, emerged from the reactor through line 9 and passed downwardly into injector 10 where it was atomized with downwardly converging streams of steam introduced through line 11. The atomized reaction mixture was mixed in dispersion chamber 12 with water or a slurry of polymer particles in water introduced by line 13. The steam enters through a jacket 14 surrounding the cold reactor effluent line 9 and is directed through nozzles 15 located at the end of the jacket so that it converges at an angle in the direction of flow of polymer suspension and strikes the cold stream of reactor effluent issuing from the line 9 at a sufficient velocity that the polymer particles are dispersed and carried away from the cold reactor effluent outlet; the steam dispersing the methyl chloride and polymer to all sides of dispersion chamber 12. It is desirable that the nozzles 15 be located about every 5° to 30° (e.g. every 22½°) around the circumference of the jacket 14 as shown in Figure 3. Hot water was introduced through pipe 13 at a tangent so that the water swirled around the walls of jacket 12 and carried the dispersed polymer and unflashed methyl chloride in unrestricted flow into flash drum 16. Flash drum 16 was partly filled with a large amount of hot water (containing 0.05 wt. percent based on polymer of sodium stearate) which was maintained at a sufficiently high temperature (e.g. 160° F.) that it volatilized the remainder of methyl chloride and unreacted monomers. The vaporized materials were withdrawn through line 17 and recycled to feed line 1. A slurry of polymer particles in water was withdrawn through line 18. The water and entrained polymer particles in water were recycled by line 13 to dispersion chamber 12 as described above.

The slurries obtained by the method of the present invention have been superior in stability to slurries heretofore obtained. Furthermore, the invention has enabled slurries to be obtained with polymer molecular weights well above 140,000 (Staudinger) in a commercial unit, which had previously been impossible.

While the foregoing description has related to the formation of slurries of high molecular weight polyisobutylene, the process of the present invention has also produced superior slurries of lower molecular weight polymers of isobutylene from reaction mixtures in solution form. The process of the present invention has also produced slurries of copolymers of isobutylene and multiolefins such as isoprene (butyl rubber) from reaction mixtures in slurry form, and produced superior slurries of copolymers of isobutylene and styrene from both reaction mixtures in solution and slurry form. Whereas excellent slurries of butyl rubber may be obtained by methods previously in use, the method in accordance with the present invention affords a simple and effective procedure for obtaining slurries of this polymer and such slurries have been shown to possess even better stability than those made by conventional methods.

Heretofore, many processes for recovering polyisobutylenes, butyl rubber, isobutylene-styrene copolymers and the like, have involved the use of chambers having a restriction or diffuser throat which must be passed through by the polymer slurry before entering the flash drum. Atomizers employed in conjunction with such a restriction have been sensitive to small increases in back pressure and will kick-back or reverse the flow in the suction or cold solution or slurry line if the back pressure rises above the critical pressure. Such a kick-back allows steam and water to enter the reactor overflow line and reactor, causing the overflow line to ice up and plug. Water is also a reaction poison and will at least partially terminate the polymerization reaction. The process and apparatus of the present invention are especially designed so that the contact of steam and cold slurry is in a relatively large zone and no restriction is offered to flow from this zone into the flash drum whereby there has been substantially no tendency to kick-back. Furthermore, the fact that the steam is converging in a direction away from the cold slurry overflow has aided in drawing the aqueous materials away from the reactor overflow line. In addition, the steam requirements and erosion of equipment employed in accordance with the process of the present invention have been decreased. It is also a preferred feature of the present invention that the flow of polymer suspension, atomization with steam, and contact with hot water are in a downward direction as well as in unrestricted flow into the flash drum. This has precluded the submerging of the atomized solution or slurry by water and has provided an additional safeguard against polymer particles and water falling back into the reactor or agglomerating in the reactor overflow line.

The nature of the present invention having been thus specifically fully set forth and illustrated, it is obvious that resort may be had to other various modifications and variations without departing from the spirit of the invention or the scope of the appended claims.

What is claimed is:

1. In a process for preparing hydrocarbon polymers from feeds containing $C_4$–$C_8$ isoolefin by Friedel-Crafts polymerization wherein a polymerization reaction mixture of solid polymer in a non-aqueous reaction diluent is formed which is discharged into a relatively large dispersion zone as compared with the passageway discharging the reaction mixture thereto and then a zone containing water, the improvement which comprises introducing a downwardly flowing stream of said reaction mixture into streams of steam converging in the direction of flow of polymer reaction mixture and injected at a sufficient velocity that the reaction mixture is dispersed, said streams of reaction mixture and steam initially coming into contact substantially immediately after their points of discharge into said relatively enlarged dispersion zone, substantially immediately contacting said dispersed reaction mixture in said relatively enlarged dispersion zone with water whereby a dispersion of polymer particles in water is obtained, and passing said dispersion in unrestricted flow into said zone containing water.

2. Process according to claim 1 in which the polymerizable components in the feed comprise an isoolefin and a multiolefin; the reaction diluent being a polymer non-solvent.

3. Process according to claim 1 in which the polymerizable components in the feed comprise an isoolefin and a vinyl aromatic hydrocarbon.

4. Process according to claim 1 in which the polymerizable component in the feed comprises isobutylene.

5. A process for producing a water dispersion of polymer particles from a polymerization reaction mixture containing a hydrocarbon polymer prepared from $C_4$–$C_8$ isoolefin-containing feeds in a halo-alkane reaction diluent by the use of a relatively enlarged dispersion zone as compared with the passageway discharging the reaction mixture thereto and a zone containing a large volume of water which comprises introducing a flowing stream of said reaction mixture into streams of steam converging in the direction of flow of polymer reaction mixture, said streams initially coming into contact substantially immediately after their points of discharge into said dispersion zone, substantially immediately contacting the resulting reaction mixture in said enlarged dispersion zone with a sufficient amount of water to form a dispersion of polymer particles in the water, and passing said dispersion in unrestricted flow from said enlarged dispersion zone into a zone containing a large volume of water.

6. Process according to claim 5 in which the halo-alkane diluent is methylchloride.

7. In a process for preparing hydrocarbon polymers from $C_4$–$C_8$ isoolefin-containing feeds by Friedel-Crafts polymerization wherein a polymerization reaction mixture of solid polymer in a non-aqueous reaction diluent is formed which is discharged into a relatively enlarged mixing zone as compared to the passageway discharging the reaction mixture thereto, and then into a zone containing warm water to volatilize the unreacted monomer and diluent, the improvement which comprises introducing a downwardly flowing stream of said reaction mixture into downwardly flowing streams of steam converging in the direction of flow of polymer reaction mixture and injected at a sufficient velocity that the polymer reaction mixture is dispersed, said reaction mixture and steam streams initially coming into contact substantially immediately after their point of discharge into said enlarged mixing zone, substantially immediately contacting the resulting admixture formed in said mixing zone with downwardly moving water whereby a dispersion of polymer particles in water is obtained, and passing said dispersion downwardly in unrestricted flow into said zone containing warm water.

8. Process according to claim 7 in which the water is moving downwardly in a swirling manner; the polymer being a chlorinated copolymer of a $C_4$ to $C_8$ iso-olefin and $C_4$ to $C_{14}$ multiolefin.

9. Process according to claim 7 in which the diluent is an alkyl chloride; the polymer being a nitroso-modified copolymer of a $C_4$ to $C_8$ iso-olefin and $C_4$ to $C_{14}$ multi-olefin.

10. Process according to claim 7 in which the polymerizable components in the feed comprise an isoolefin and a multi-olefin.

11. Process according to claim 7 in which the polymerizable components in the feed comprise an isoolefin and a vinyl aromatic hydrocarbon.

12. Process according to claim 7 in which the polymerizable component in the feed comprises a $C_4$ to $C_8$ isoolefin.

References Cited in the file of this patent

UNITED STATES PATENTS

| 2,462,123 | Nelson | Feb. 22, 1949 |
| 2,487,458 | Marnon et al. | Nov. 8, 1949 |
| 2,595,797 | Leyonmark et al. | May 6, 1952 |
| 2,607,763 | Hipkin et al. | Aug. 19, 1952 |
| 2,730,433 | Cartledge | Jan. 10, 1956 |
| 2,739,136 | Kharasch | Mar. 20, 1956 |
| 2,766,224 | Bannon | Oct. 9, 1956 |